No. 683,869. Patented Oct. 1, 1901.
G. H. WEICHERT.
FINGER TIP FOR GLOVES.
(Application filed Dec. 19, 1900.)
(No Model.) 2 Sheets—Sheet 1.
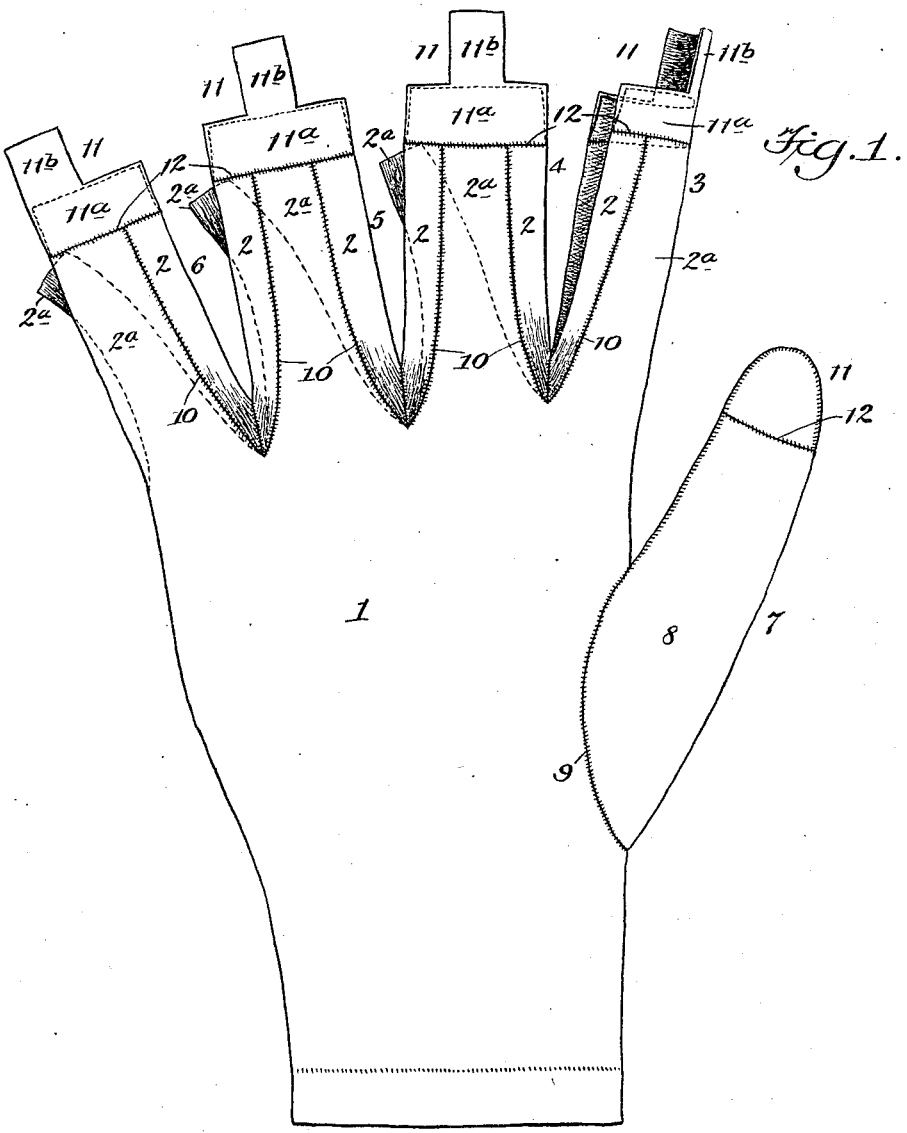

No. 683,869. Patented Oct. 1, 1901.
G. H. WEICHERT.
FINGER TIP FOR GLOVES.
(Application filed Dec. 19, 1900.)
(No Model.) 2 Sheets—Sheet 2.
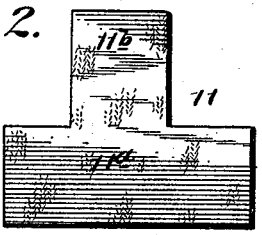
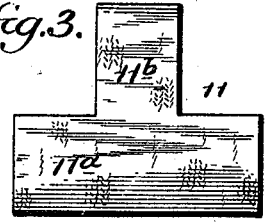
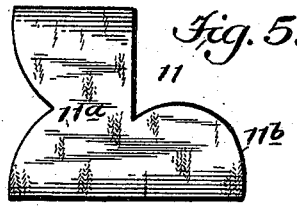
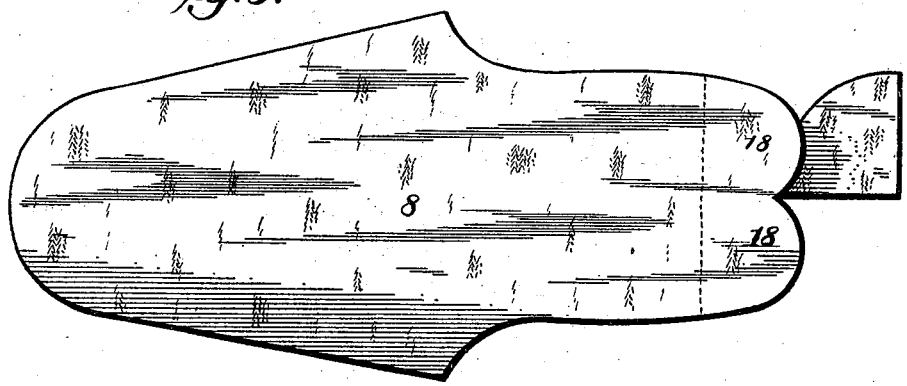
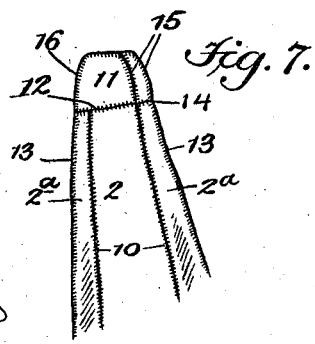
WITNESSES:
A. R. Appleman Jr.
J. M. Hoctor
INVENTOR
Gustave H. Weichert,
BY J. R. Littell,
his ATTORNEY.
THE NORRIS PETERS CO., PHOTO-LITHO., WASHINGTON, D. C.

UNITED STATES PATENT OFFICE.

GUSTAVE H. WEICHERT, OF FULTONVILLE, NEW YORK.

FINGER-TIP FOR GLOVES.

SPECIFICATION forming part of Letters Patent No. 683,869, dated October 1, 1901.

Application filed December 19, 1900. Serial No. 40,392. (No model.)

*To all whom it may concern:*

Be it known that I, GUSTAVE H. WEICHERT, a citizen of the United States, residing at Fultonville, in the county of Montgomery and State of New York, have invented certain new and useful Improvements in Finger-Tips for Gloves, of which the following is a specification.

This invention relates to finger-tips for gloves; and it has for its object to provide an improved finger-tip of this class which will be effectively reinforced at the sides as well as the front and rear of the glove-fingers, which will prevent the finger-seams from ripping, and which will possess advantages in point of durability, efficiency, convenience, and neatness of appearance.

In the drawings, Figure 1 is a perspective view of the reverse side of a glove-blank, illustrating my improved finger-tips in the various stages of formation and assemblage of parts. Fig. 2 is a plan view of a tip-piece constituting an element of the present invention and adapted in form for embodiment in the index-finger of a glove. Fig. 3 is a plan view of a similar tip-piece adapted in form for embodiment in the second and third fingers of a glove. Fig. 4 is a plan view of another similar tip-piece adapted in form for embodiment in the little finger of a glove. Fig. 5 is a plan view of a further similar tip-piece adapted in form for embodiment in the thumb of a glove. Fig. 6 is a plan view of a blank of a glove-thumb, showing the tip-piece connected therewith. Fig. 7 is a detail inside perspective view of a completed finger and tip, the same being the second finger of a glove.

Corresponding parts in all the figures are denoted by the same reference characters.

Referring to the drawings, 1 designates a glove-blank provided with the several finger-body strips $2^a$ and with the several fourchettes 2, which in assembled form constitute the fingers. The blank 1 is formed in the customary or any preferred manner, there being provided for the index-finger one of the fourchettes, as at 3, for the second finger two of the fourchettes, as at 4, and for the third finger two of the fourchettes, as at 5, and for the little finger one of the fourchettes, as at 6. Each of the fingers embodies two of the body-strips $2^a$, with the exception of the index-finger, which embodies but one of the same. The thumb 7 consists of a single blank 8, which is secured to the glove-blank by stitching or otherwise, as at 9. The several fourchettes and body-strips of each finger are stitched together, as at 10, to complete the finger-body formation. Previous, however, to the incorporation of the final body-strip in the finger-body the respective tip-piece 11 is stitched to the tip or outer end of the partly-completed finger-body transversely of the same, as designated at 12, Fig. 1.

The tip-piece 11 is adapted in form to the specific finger construction in which it is ultimately incorporated; but each of the tip-pieces consists of a main member or wing $11^a$ and a relatively narrower supplemental projecting member or wing $11^b$. Said members $11^a$ and $11^b$ are preferably integral in formation, being cut or stamped out of silk or other glove fabric. The main member $11^a$ is stitched to the incompleted body of the respective finger, as at 12, as above described, so that the supplemental member $11^b$ projects beyond the outer ends of the same, and the form of the main member is such that it exactly fits and covers the ends of the fourchettes and body-strips with which it is connected. The tip-piece is sewed to the inner sides of the fourchetts and body-strips or that side which constitutes the inner side when the glove-finger is completed in assembled formation.

It will be noted that the main member $11^a$ of the tip-piece when connected with the outer ends of the several joined fourchettes and body-strips extends across the lines of stitching 10, by which the several parts are connected.

When the main member of the tip-piece has been secured in position, as above described, the final body-strip $2^a$ is sewed at its edges, as at 13, to the outer edges of the partly-formed finger-body above described and the finger-tip is completed by sewing in the customary manner. The supplemental member $11^b$ of the tip-piece is then turned down and stitched to the last-incorporated body-strip transversely of the same, as designed at 14 in Fig. 7. The supplemental tip-piece member is also sewed at its side edges, as at 15, to the side edges of the body-strip with which it is connected. The main member 11ª is also attached at its edges, as at 16, to the parts with which it is connected.

The tip-pieces 11 are preferably formed of lighter and thinner material than the remaining part of the glove-fingers, and undue bulkiness of the fingers is thus avoided.

In adapting my improved tip-piece to glove-finger constructions in which but one of the fourchettes is employed, as designed at 3 in Fig. 1, this being the preferred number employed in constructing the index glove-finger, the main member 11ª of the tip-piece 11 is sewed to the fourchette and body-strip in the manner above described, as at 12, and the supplemental member is turned down and sewed to the face of the body-strip, so as to complete a cap over the tip of the glove-finger. This tip-piece is provided with a relatively wide supplemental member 11$^b$, as illustrated in Fig. 2.

The glove-thumb blank 8 is formed at its outer end with two similar curved tip portions 18, and the main member of the tip-piece, which is illustrated in Fig. 5 and is adapted to fit the same, is formed in contour to fit the said curved tip portions 18. The supplemental member 11$^b$ of this form of tip-piece projects from one side of the main member and is of proper form to fit the edge contour of one of the tip portions 18 when folded down over and sewed at its edges to the same.

The tip-piece for the little glove-finger, which latter embodies one of the fourchettes, is preferably so formed, as shown in Fig. 4, that the supplemental member 11$^b$ projects at an angle from one end of the main member 11ª, whereas in the tip-pieces for the other fingers the supplemental member projects substantially centrally from the main member.

In sewing the several parts of the glove-finger together, in the formation of the glove-finger and the tip thereof, and in sewing the tip-piece to the finger-tip the lines of stitching may manifestly be variously arranged with a view to economy of stitching and permanence of connection of the parts.

The operation and advantages of my improved finger-tip for gloves will be readily understood by those skilled in the art to which it appertains. The tip-piece extends entirely around the inner side of the tip of the glove-finger, across the lines of stitching which unite the several parts, and thus reinforces the same and prevents starting of the seams. The tip-piece serves as a cap for the tip of the glove-finger and protects the latter at the sides, as well as at the front and back. In adapting the tip-piece to the index-finger and to the thumb of the glove a double formation of the tip-piece is preferable, as the friction between these fingers is ordinarily greater than between the other fingers, and they consequently wear out more quickly.

The main member 11ª and the supplemental member 11$^b$ of the tip-piece in their combined association with the glove-finger tip form a continuous-sided pocket which effectively reinforces and strengthens the finger-tip at all points and in all respects and does not in any manner injure the appearance, fit, or utility of the glove.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. An improved glove provided with glove-fingers consisting each of body-strips, fourchettes stitched to the same, and a tip-piece secured interiorly of each glove-finger and connected with the fourchettes and the body-strips to form a cap for the finger-tip, said tip-piece consisting of a main member which is secured to both the body-strips and the fourchettes and a supplemental member which is secured to one of the same in opposition to the main member.

2. An improved glove provided with glove-fingers consisting each of body-strips, fourchettes stitched to the same, and a tip-piece secured interiorly of the finger-tip and consisting of two members which are respectively connected with predetermined parts of the fourchettes and body-strips and extend across the ends of the same to form a cap for the finger-tip.

3. An improved glove provided with glove-fingers comprising each the body-strips, the fourchettes stitched to the same, and a tip-piece which is secured interiorly of the finger-tip and consists of a main member which is secured to the body-strips and fourchettes, and a supplemental projecting member which extends across the top portion of the finger-tip and is secured to one of the body-strips to constitute a cap for the finger-tip.

In testimony whereof I have signed my name in the presence of the subscribing witnesses.

GUSTAVE H. WEICHERT.

Witnesses:
FREDRICK HOUBERT,
WILLIAM D. WELCH.